US012698855B2

(12) United States Patent
Töppler et al.

(10) Patent No.: US 12,698,855 B2
(45) Date of Patent: Aug. 4, 2026

(54) FLUID CONNECTION SYSTEM

(71) Applicant: A. RAYMOND ET CIE, Grenoble (FR)

(72) Inventors: Hanno Friedhelm Martin Töppler, Schopfheim (DE); Eva Katharina Saaler, Hasel (DE); Axel Feger, Lörrach (DE)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 19/040,011

(22) Filed: Jan. 29, 2025

(65) Prior Publication Data

US 2025/0243957 A1 Jul. 31, 2025

(30) Foreign Application Priority Data

Jan. 29, 2024 (DE) .......................... 102024102387.2

(51) Int. Cl.
F16L 37/092 (2006.01)
(52) U.S. Cl.
CPC ................................... F16L 37/092 (2013.01)
(58) Field of Classification Search
CPC ... F16L 37/12; F16L 37/1205; F16L 37/1225; F16L 37/123; F16L 37/144; F16L 37/56;
F16L 37/092; F16L 37/0885; F16L 37/0985; F16L 37/098; F16L 37/0841; F16L 41/02; F16L 41/021; F16L 41/023; F16L 41/03; F16L 47/26; F16L 47/32; F16L 37/008
See application file for complete search history.

(56) References Cited

U.S. PATENT DOCUMENTS

| | | | | | |
|---|---|---|---|---|---|
| 4,953,592 | A | * | 9/1990 | Takahashi | ................ F16L 37/32 |
| | | | | | 137/614.04 |
| 7,472,929 | B2 | | 1/2009 | Fattorusso et al. | |
| 2018/0043317 | A1 | * | 2/2018 | Kimberlin | ............... F04C 2/344 |

* cited by examiner

*Primary Examiner* — Aaron M Dunwoody
(74) *Attorney, Agent, or Firm* — WARNER NORCROSS + JUDD LLP

(57) ABSTRACT

A fluid connection system for a cleaning system of a car includes at least two connections, wherein each of the at least two connections includes a male connector and a female connector. For each of the at least two connections the male connector includes an outlet opening and the female connector includes an inlet opening, and the male connector and the female connector are configured to fluidly connect the outlet opening to the inlet opening in an assembled state. For each of the at least two connections the length of the male connector is adapted to the length of the female connector. The length differs for each of the at least two connections.

18 Claims, 6 Drawing Sheets

FLUID CONNECTION SYSTEM

FIELD OF THE INVENTION

Figure 1:
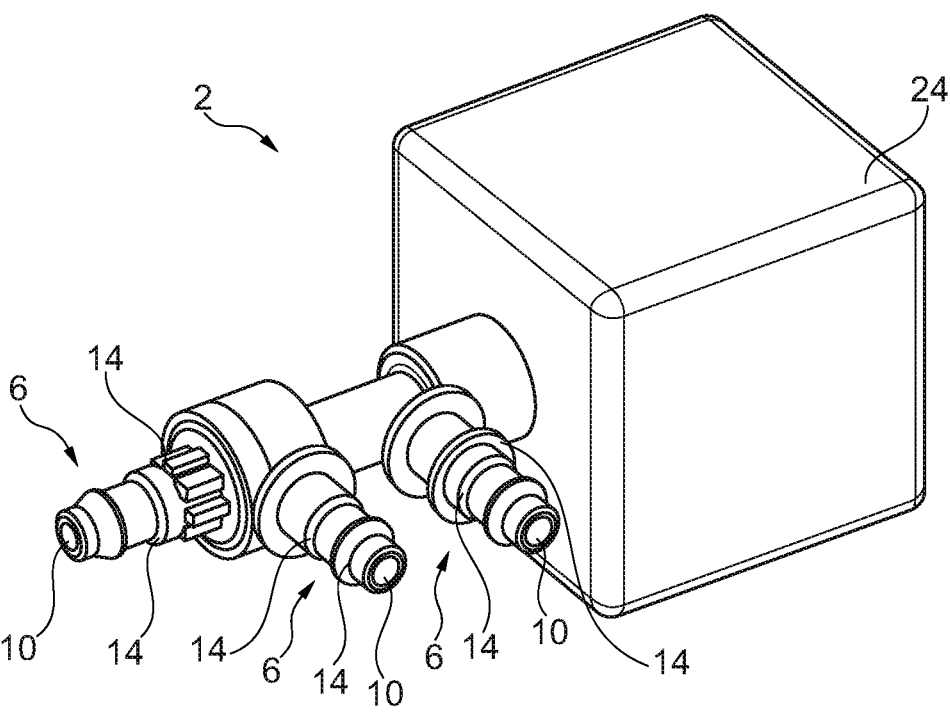

The present invention pertains to a fluid connection system for a cleaning system of a car and a vehicle, in particular a car, comprising a tube, a nozzle and the fluid connection system according to the invention.

BACKGROUND OF THE INVENTION

A fluid connection system for a cleaning system of a car is used to connect multiple tubes by the fluid connection system. Here, a correct connection is mandatory for the function of the cleaning system. If the tubes are wrongly connected the cleaning system may not work or in the worst case be damaged, since the wrong fluid and/or the wrong pressure is applied to the tubes.

Therefore, it is important to assure that the connections are correctly connected. Here, in the prior art varying diameters of the tube and the connection piece are used. From U.S. Pat. No. 7,472,929 B2 a system is known which comprises two connection pieces with different outer diameters. Consequently, the tubes connected to the two connection pieces also have different inner diameters. In this way, it is assured that the tubes are correctly connected to the connection pieces.

U.S. Pat. No. 7,472,929 B2 discloses a system with at least two connection pieces. Here, the outer diameter of each connection piece varies over the length of the connection piece. Thus, tubes with different inner diameter can be connected to the connection pieces.

Though, in the prior art tubes with different inner diameters are needed. Due to the different diameters the flow, the pressure and/or the volume flow varies. Therefore, the known systems complicate the regulation of a uniform fluid flow through all tubes.

Moreover, the inner diameters of the tubes only slightly vary so that during the assembly of the tubes errors regularly occur. Even though, the tubes and the connection pieces have different diameters, a wrong connection can be still established by applying to much force on the tube during connecting. Hence, the fluid connection system does not work or can be damaged.

Based on this prior art it is the object of the invention to provide a durable and cost-effective fluid connection system, which is an error proof system and easy to assemble, while at the same time the fluid connection system guarantees the function of the fluid connection system and a uniform fluid flow.

SUMMARY OF THE INVENTION

According to a first aspect of the invention the above-mentioned object is solved by a fluid connection system for a cleaning system of a car, wherein the fluid connection system comprises at least two connections, wherein each of the at least two connections comprises a male connector and a female connector, wherein for each of the at least two connections the male connector comprises an outlet opening and the female connector comprises an inlet opening, wherein for each of the at least two connections the male connector and the female connector are configured to fluidly connect the outlet opening to the inlet opening in an assembled state, wherein for each of the at least two connections the length of the male connector is adapted to the length of the female connector, wherein the length differs for each of the at least two connections.

The fluid connection system provides the advantage that the fluid connection system is error proof so that the function of the fluid connection system is assured. Hence, the fluid connection system provides a good durability. Moreover, the fluid connection system is easy to assemble since only the correct male connector and the correct female connector can be connected due to the same length. In addition, the fluid connection system provides a uniform fluid flow. Further, the fluid connection system can be cost-effective.

The fluid connection system can be a system to provide a fluid from a central supply to various fluid outlets. The various fluid outlets can be for example nozzles of a cleaning system. The fluid connection system can be configured to provide a uniform fluid flow through all tubes. For example, the cleaning system can be configured to clean a windscreen, a sensor and/or a headlight.

The at least two connections can be a fluid connection for example of tubes or of a tube and a distributor. The at least two connections can be configured to fluidly connect for example tubes or a tube and a distributor.

The male connector can have a protruding part that can be inserted into a receiving space of the female connector. The shape of the male connector can be adapted to the shape of the female connector.

The outlet opening can be configured to output a fluid, which can be inside the fluid connection system. The inlet opening can be configured to receive a fluid, which can be inside the fluid connection system. The outlet opening and the inlet opening can have the same cross-section. The outlet opening can be arranged at the end of the male connector. The inlet opening can be arranged spaced apart from an end of the female connector. In particular, the inlet opening can be arranged spaced apart from an end of the female connector into which the male connector can be inserted.

The male connector and the female connector are configured to fluidly connect the outlet opening to the inlet opening in an assembled state. The assembled state can be the state where the male connector and the female connector can be connected to each other, in particular in a form-locking and/or force-locking manner. The outlet opening and the inlet opening can be fluidly connected if fluid can be transferred without losing a part of the fluid from the outlet opening to the inlet opening.

The length of the male connector is adapted to the length of the female connector. The length of the male connector can be the protruding part of the male connector that can be inserted into the female connector, in particular into a receiving space of the female connector. The length of the female connector can be length of the receiving space of the female connector into which the male connector can be inserted. The male connector and the female connector can be configured to only lock with each other if the length of the male connector and the female connector can be the same.

The length differs for each of the at least two connections. For example, the length can be the same only for one male connector and one female connector. The length of the male connector of the first connection of the at least two connections can differ from the length of the male connector of the second connector of the at least two connections and the length of the female connector of the second connector of the at least two connections.

For example, the fluid connection system can comprise at least two connections, wherein the first connection of the at least two connections can comprise a first male connector and a first female connector, wherein the first male connector can be configured to be fluidly connected to the first female connector, wherein the first male connector can comprise an outlet opening and at least one limiting element, wherein the at least one limiting element can be arranged in the flow direction before the outlet opening, wherein the first female connector can comprise an inlet opening and at least one restriction mean, wherein the at least one restriction mean can be arranged in the flow direction before the inlet opening, wherein in the assembled state the at least one restriction mean can abut against the at least one limiting element, wherein in the assembled state the outlet opening can be connected to the inlet opening, and wherein the second connection of the at least two connections can comprise a second male connector and a second female connector, wherein the second male connector can be configured to be fluidly connected to the second female connector, wherein the second male connector can comprise an outlet opening and at least one limiting element, wherein the at least one limiting element can be arranged in the flow direction before the outlet opening, wherein the second female connector can comprise an inlet opening and at least one restriction mean, wherein the at least one restriction mean can be arranged in the flow direction before the inlet opening, wherein in the assembled state the at least one restriction mean can abut the at least one limiting element, wherein in the assembled state the outlet opening can be connected to the inlet opening, wherein the length from the at least one limiting element to the outlet opening can correspond to the distance from the at least one restriction mean to the inlet opening, and wherein the length of the first of the at least two connections can differ from the length of the second of the at least two connections.

In an embodiment the male connector of one connection of the at least two connections can only match to the female connector of the same connection of the at least two connections.

In this way, the fluid connection system can be error proof so that the function of the fluid connection system can be assured. Moreover, the fluid connection system can be easy to assemble since only the male connector and the female connector can be correctly connected. In addition, the fluid connection system can provide a uniform fluid flow.

The one connection and the same connection can be the same connection. The one connection can be one of the at least two connections. In particular, all connections can differ from each other since they all differ in length so that the one connection can be one of the at least two connections. For the one or rather the same connection the length of the male connector can correspond to the length of the female connector.

In an embodiment the male connector can comprise at least one limiting element, wherein the at least one limiting element can be spaced apart from the outlet opening, wherein the female connector can comprise at least one restriction mean, wherein the at least one restriction mean can be spaced apart from the inlet opening, wherein the length can be the distance from the at least one limiting element to the outlet opening and from the at least one restriction mean to the inlet opening.

In this way, the fluid connection system can be error proof so that the function of the fluid connection system can be assured. Moreover, the fluid connection system can be easy to assemble since only the male connector and the female connector can be correctly connected due to the at least one limiting element and the at least one restriction element. In addition, the fluid connection system can provide a uniform fluid flow.

The at least one limiting element can be configured to limit a movement of the male connector into the female connector, in particular into the receiving space of the female connector. The movement of the male connector into the female connector can be along the flow direction of the fluid of the fluid connection system. To limit the movement of the male connector the at least one limiting element can have a contact surface, which can interact with the female connector, in particular the at least one restriction mean. The at least one limiting element can have a contact to the surface of the female connector so that because of the contact the movement of the male connector into the female connector, in particular into the receiving space of the female connector, can be limited.

The at least one restriction mean can be configured to limit a movement of the male connector into the female connector, in particular into the receiving space of the female connector. The movement of the male connector into the female connector can be along the flow direction of the fluid of the fluid connection system. To limit the movement of the male connector the at least one restriction mean can have a contact plan, which can interact with the male connector, in particular the at least one limiting element. The at least one restriction mean can have a contact to the surface of the male connector so that because of the contact the movement of the male connector into the female connector, in particular into the receiving space of the female connector, can be limited.

The at least one limiting element and the at least one restriction mean can be configured to limit the movement of the male connector into the female connector, in particular into the receiving space of the female connector, in a form-locking manner. For example, the contact surface of the at least one limiting element can contact the contact plan of the at least one restriction mean to limit the movement of the male connector into the female connector. For example, the contact surface can face the outlet opening and/or the contact plan can face the inlet opening.

The at least one limiting element can be spaced apart from the outlet opening. For example, the at least one limiting element can be arranged in the flow direction before the outlet opening. In particular, the at least one limiting element and the outlet opening can be separated.

The at least one restriction mean can be spaced apart from the inlet opening. For example, the at least one restriction mean can be arranged in the flow direction before the inlet opening. In particular, the at least one restriction mean and the inlet opening can be separated.

In an embodiment the at least one limiting element can exhibit an outer diameter, wherein the outer diameter of the at least one limiting element can be different for each male connector of the at least two connections, wherein the female connector of at least one of the at least two connections can comprise an insertion space, wherein the insertion space can be arranged between the at least one restriction mean and an open end of the female connector of at least one of the at least two connections, wherein the insertion space can exhibit an inner diameter, wherein the inner diameter of the insertion space of the female connector of the at least one of the at least two connections can be the same as the outer diameter only of the at least one limiting element of the male connector of the same connection of the at least two connections.

In doing so, the fluid connection system can provide the advantage that the fluid connection system can be error proof so that the function of the fluid connection system can be assured. Thus, a good durability of the fluid connection system can be ensured. Moreover, the fluid connection system can be easy to assemble since only the correct male connector and the correct female connector can be connected. In addition, the fluid connection system can be cost-effective.

The outer diameter of the at least one limiting element can be the spatial extend of the at least one limiting element transverse, in particular perpendicular, to the flow direction of the fluid. The outer diameter of the at least one limiting element can be the spatial extend of the at least one limiting element transverse, in particular perpendicular, to the direction to connect the male connector with the female connector. The outer diameter can be the distance between two outer edges of the at least one limiting element connected via the centre of the at least one limiting element.

The insertion space can be an area into which a part of the male connector is inserted. The insertion space can be a part of the receiving space. The insertion space can be arranged between the at least one restriction mean and the open end. The at least one restriction mean can be the restriction mean that interacts with the at least one limiting element. The open end can be the open end of the female connector the male connector into.

The inner diameter of the insertion space can be the spatial extend of the insertion space transverse, in particular perpendicular, to the flow direction of the fluid. The inner diameter of the insertion space can be the spatial extend of the insertion space transverse, in particular perpendicular, to the direction to connect the male connector with the female connector. The inner diameter can be the distance between two inner walls of the insertion space connected via the centre of the insertion space.

The inner diameter of the insertion space of the female connector of at least one of the at least two connections can be the same as the outer diameter only of the at least one limiting element of the male connector of the same connection of the at least two connections. Hence, only the at least one limiting element with the same outer diameter as the inner diameter can be inserted into the insertion space and hence into the female connector. The inner diameter and the outer diameter can be the same, wherein an insertion of the male connector into the female connector can be possible.

In an embodiment the at least one restriction mean can abut against the at least one limiting element in the assembled state, and/or wherein the outlet opening can be adjacent to the inlet opening in the assembled state.

If the at least one restriction mean can abut against the at least one limiting element in the assembled state, the connection of the male connector and the female connector can be very simple. Thus, the assembly of the fluid connection system can be very easy. In addition, the assembly can be error proof, since a correct assembly can be easily checked.

If the outlet opening can be adjacent to the inlet opening in the assembled state, the fluid connection system can provide a uniform fluid flow.

If the at least one restriction mean can abut against the at least one limiting element in the assembled state, and wherein the outlet opening can be adjacent to the inlet opening in the assembled state, the fluid connection system can be very efficient since a correct assembly can be assured and at the same time a good fluid connection can be guaranteed. In addition, since the at least one restriction mean can abut against the at least one limiting element in the assembled state, and wherein the outlet opening can be adjacent to the inlet opening in the assembled state the fluid connection system can be very good aligned and very reliable.

The at least one restriction mean can abut against the at least one limiting element in the assembled state. Therefore, the contact surface of the at least one limiting element can contact the contact plan of the at least one restriction mean to limit the movement of the male connector into the female connector.

The outlet opening can be adjacent to the inlet opening in the assembled state. Hence, the outlet opening can be so close to the inlet opening that a good fluid flow from the outlet opening to the inlet opening can be guaranteed. This can mean that no fluid can be lost.

In an embodiment the inner diameter of the outlet opening and the inner diameter of the inlet opening can be the same, in particular for all of the at least two connections.

In doing so, the fluid flow can be uniform inside the fluid connection system so that the efficiency of the fluid connection system can be increased due to a uniform fluid flow. If the inner diameter of the outlet opening and the inner diameter of the inlet opening can be the same for all of the at least two connections the fluid flow can be uniform inside the whole fluid connection system so that the efficiency of the fluid connection system can be further increased due to a uniform fluid flow.

The inner diameter can be the length of a straight line going through the center of the outlet opening from one side of the outlet opening to an opposite side of the outlet opening. The inner diameter can be the length of a straight line going through the center of the inlet opening from one side of the inlet opening to an opposite side of the inlet opening. If the inner diameter of the outlet opening and the inner diameter of the inlet opening can be the same for all of the at least two connections each outlet openings of all male connectors of the fluid connection system and each inlet opening of all female connectors of the fluid connection system can be the same.

In an embodiment the male connector can be detachably connected with the female connector, and/or wherein the male connector can be connected with the female connector in a form-locking and/or force-locking manner.

If the male connector can be detachably connected with the female connector, parts of the fluid connection system can be easily replaced. Thus, the durability of the fluid connection system can be enhanced.

If the male connector can be connected with the female connector in a form-locking and/or force-locking manner the assembly can be very easy.

If the male connector can be detachably connected with the female connector, and wherein the male connector can be connected with the female connector in a form-locking and/or force-locking manner the connection of the female connector can be very durable and easy to close and to open. Consequently, the assembly and disassembly of the fluid connection system can be very easy and thus, the durability can be enhanced.

The male connector can be detachably connected with the female connector so that the male connector can be detached from the female connector non-destructively.

In an embodiment the female connector can comprise an opening at least partially extending from the inlet opening to the at least one restriction mean, wherein in particular a retaining element can be arranged inside the opening, wherein in particular the retaining element can fix, in particular in a form-locking and/or force-locking manner, the male connector to the female connector in the assembled state.

If the female connector can comprise an opening at least partially extending from the inlet opening to the at least one restriction mean, the female connector can be light so that the handling and therefore the assembly of the fluid connection system can be very easy.

If the female connector can comprise an opening at least partially extending from the inlet opening to the at least one restriction mean, wherein in particular a retaining element can be arranged inside the opening, wherein in particular the retaining element can fix, in particular in a form-locking and/or force-locking manner, the male connector to the female connector in the assembled state, the male connector can be easily connected to the female connector. In addition, the retaining element can be placed inside the opening so that the retaining element can be visible. Hence, connection of the male connector to the female connector can be checked. Moreover, the retaining element can be used for assembly. Hence, the assembly of the fluid connection system can be simplified.

The opening can be a material withdrawal inside the female connector. The opening can connect the inside of the female connector to the outside of the female connector. The opening can be at least partially extending from the inlet opening to the at least one restriction mean. Hence, the at least one opening can be arranged before the inlet opening so that the fluid flow cannot be hindered by the opening. In particular, in the assembled state the outlet opening of the male connector can be arranged behind the opening in the flow direction.

The retaining element can be arranged inside the opening. In particular the retaining element can be arranged inside two openings, wherein the two openings are arranged on opposite sides of the female connector, wherein the retaining element can have to activation planes, wherein the activation planes can be arranged inside the two openings, wherein the retaining element can have two arches, wherein each arch can connect an end of an activation plane to an end of the other activation plane, wherein the arches can be configured to move to the outside of the female connector, when the two activation planes can be pressed into the inside of the female connector.

For example, the two arches can each have a holding mean, wherein the male connector can have two receiving means, wherein in the assembled state the holding means can interact with the receiving means to fix the male connector inside the female connector.

In an embodiment the female connector can comprise a sealing element, in particular a D-ring, wherein the sealing element can be arranged at the inlet opening.

If the female connector can comprise a sealing the fluid flow from the male connector to the female connector can be improved so that the fluid connection system can provide a very good fluid flow. If the sealing element is a D-ring the connection of the outlet opening to the inlet opening can be impermeable so that the fluid flow of the fluid connection system can be further enhanced.

A sealing element can be for example an O-ring. A D-ring can have the shape of a D, wherein the flat surface can be pressed against the surface of the female connector and the arche can be pointing into the center of the female connector.

In an embodiment the male connector can be monolithic.

In this way, the male connector can be very durable, and the male connector can be produced in a very cost-effective way. Thus, the fluid connection system can be very durable and cost-effective.

Monolithic can mean that the male connector can be made as one-piece.

In an embodiment the fluid connection system can comprise a valve, wherein the valve can be fluidly connected with the at least two connections.

In doing so, the fluid connection system can provide a very uniform fluid flow. The valve can be configured to regulate the fluid flow through each of the connections of the at least two connections. The valve can be arranged before the connections in the flow direction.

In an embodiment the fluid connection system can be designed for a fluid pressure from 5 bar, in particular 8 bar, up to 12 bar.

In doing so, the fluid connection system can provide a very good fluid flow. For example, the fluid flow can be sufficient for a cleaning system of a car.

In this way, the fluid connection system can have the advantage that the fluid connection system can be error proof so that the function of the fluid connection system can be assured. Hence, the fluid connection system can provide a good durability. Moreover, the fluid connection system can be easy to assemble since only the male connector and the female connector can be connected due to the same length. In addition, the fluid connection system can provide a uniform fluid flow. Further, the fluid connection system can be cost-effective.

In an embodiment the male connector and the female connector of each of the at least two connections can have a corresponding rotation symmetry.

In doing so, the correct assembly can be further improved and simplified as another error proof system can be added. Consequently, the function of the fluid connection system can be assured. Hence, the fluid connection system can have a good durability. Moreover, the fluid connection system can be easy to assemble since only the male connector and the female connector can be connected with the same rotation symmetry. Further, the fluid connection system can be cost-effective since an additional rotation symmetry can be produced cost-effective.

The rotation symmetry can be the property that a shape can have when it looks the same after some rotation by a partial turn. The degree of rotational symmetry of the male connector and the female connector can be the number of distinct orientations in which they can look exactly the same for each rotation.

In an embodiment the rotation symmetry can be realized by a rotationally symmetric cross section, wherein in particular the rotationally symmetric cross section can be realized by a notch and/or a polygonal cross section.

In this way, the correct assembly can be facilitated as another error proof system can be added. Consequently, the function of the fluid connection system can be assured. Hence, the fluid connection system can provide a good durability. Moreover, the fluid connection system can be easy to assemble since only the male connector and the female connector can be connected with the same rotation symmetry. Further, the fluid connection system can be cost-effective since an addition rotation symmetry can be produced cost-effective.

The rotationally symmetric cross section can be the cross section of the male connector and the female connector perpendicular to the flow direction. The polygonal cross section can be for example the shape of a rectangle, a triangular or a square, which can correspond to a degree of rotation symmetry of two, three or four, respectively. By a notch a degree of rotation symmetry of one can be achieved.

In an embodiment the fluid connection system can consist of three connections.

The fluid connection system provides the advantage that the fluid connection system can be error proof so that the function of the fluid connection system can be assured. Hence, the fluid connection system can provide a good durability. Moreover, the fluid connection system can be easy to assemble since only the male connector and the female connector can be connected due to the same length. In addition, the fluid connection system can provide a uniform fluid flow. Further, the fluid connection system can be cost-effective. In particular, with three connections a very good fluid supply can be assured for example for a cleaning system of a car.

According to a second aspect of the invention the above-mentioned object is solved by a vehicle, in particular a car, comprising a tube, a nozzle and the fluid connection system according to the invention, wherein the tube, the nozzle and the fluid connection system are fluidly connected.

The fluid connection system provides the advantage that the fluid connection system is error proof so that the function of the fluid connection system is assured. Hence, the fluid connection system and thus the vehicle provides a good durability. Moreover, the fluid connection system and therefore the vehicle too is easy to assemble since only the male connector and the female connector can be connected due to the same length. In addition, the fluid connection system provides a uniform fluid flow. Hence, the in the vehicle a very good fluid flow distribution is provided. Further, the fluid connection system and hence the vehicle are cost-effective.

According to a third aspect of the invention the above-mentioned object is solved by a use of a fluid connection system according to the invention for a cleaning system.

Other objects, features, advantages and aspects of the present invention will become apparent to those skilled in the art from the following description and appended claims. It should be understood, however, that the following description, appended claims, and specific examples, which indicate preferred embodiments of the application, are given by way of illustration only. Various changes and modifications within the spirit and scope of the disclosed invention will become readily apparent to those skilled in the art from reading the following.

Definitions

As used herein, the following expressions are generally intended to preferably have the meanings as set forth below, except to the extent that the context in which they are used indicates otherwise.

The expression "comprise", as used herein, besides its literal meaning also includes and specifically refers to the expressions "consist essentially of" and "consist of". Thus, the expression "comprise" refers to embodiments wherein the subject-matter which "comprises" specifically listed elements does not comprise further elements as well as embodiments wherein the subject-matter which "comprises" specifically listed elements may and/or indeed does encompass further elements. Likewise, the expression "have" is to be understood as the expression "comprise", also including and specifically referring to the expressions "consist essentially of" and "consist of". The term "consist essentially of", where possible, in particular refers to embodiments wherein the subject-matter comprises 20% or less, in particular 15% or less, 10% or less or especially 5% or less further elements in addition to the specifically listed elements of which the subject-matter consists essentially of.

FIGURES

Figure 2:
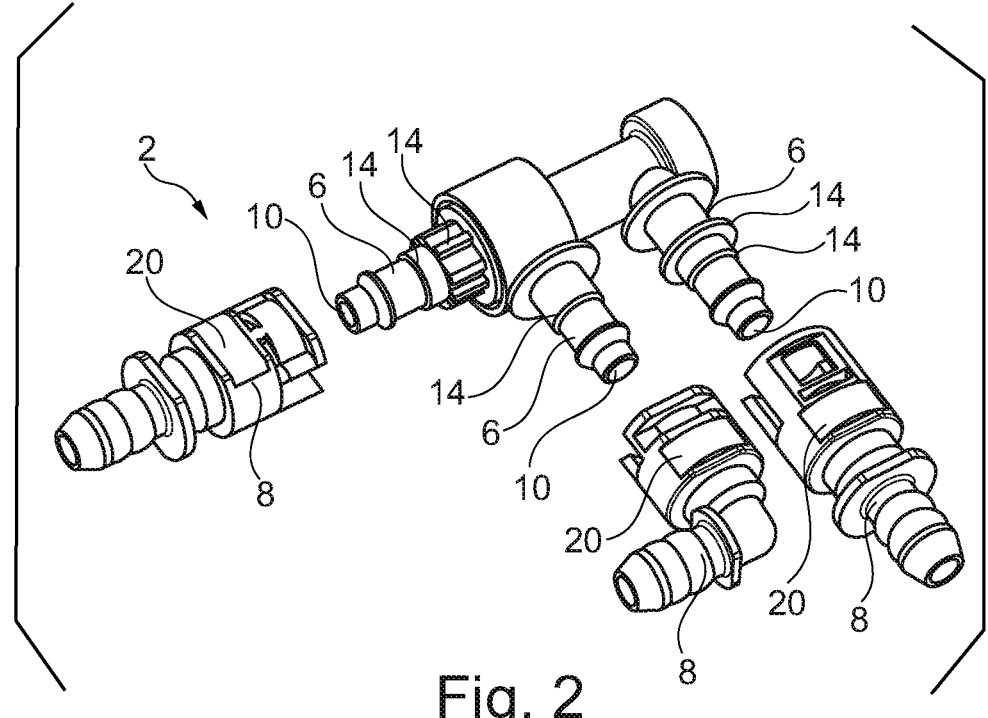
Figure 3:
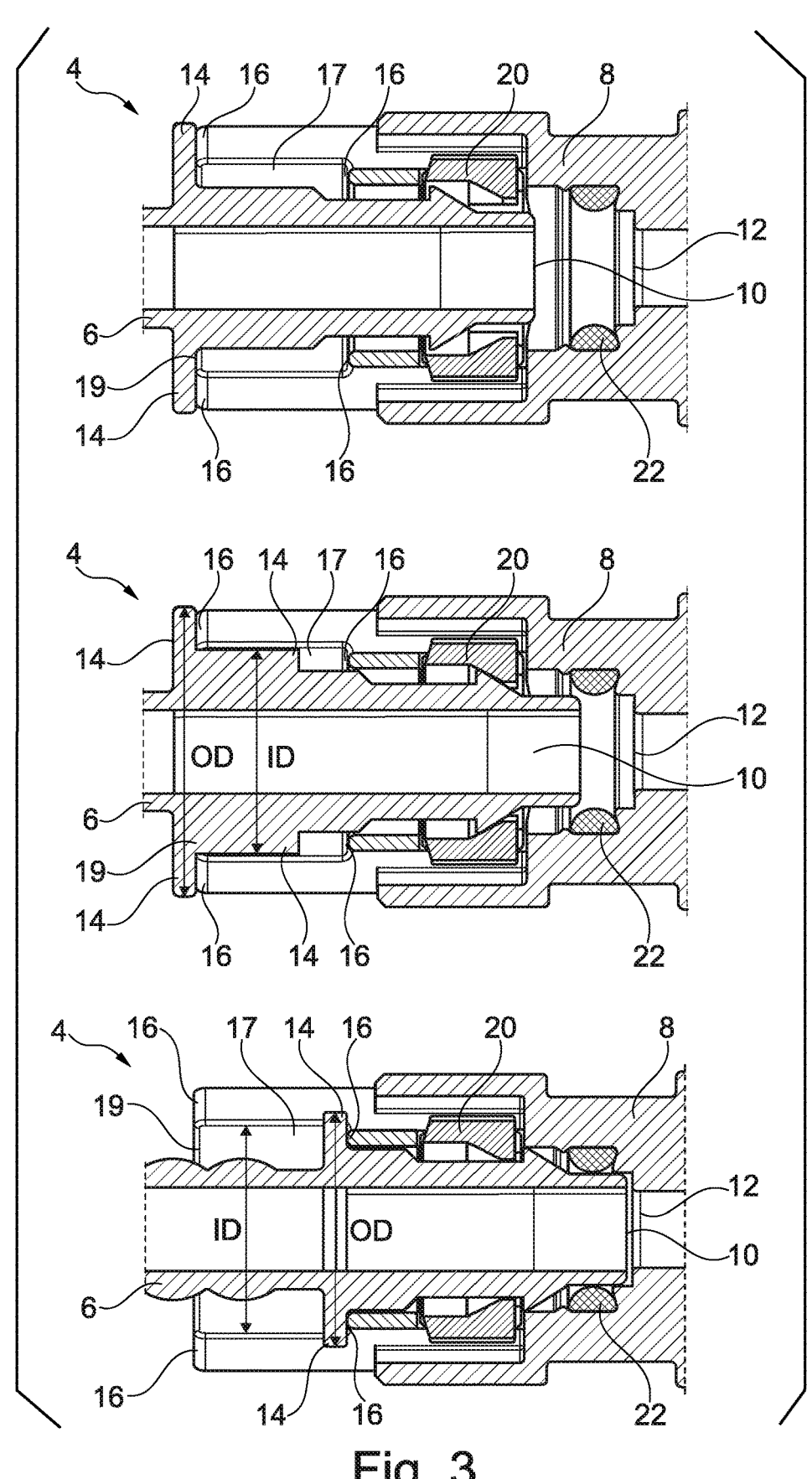
Figure 4:
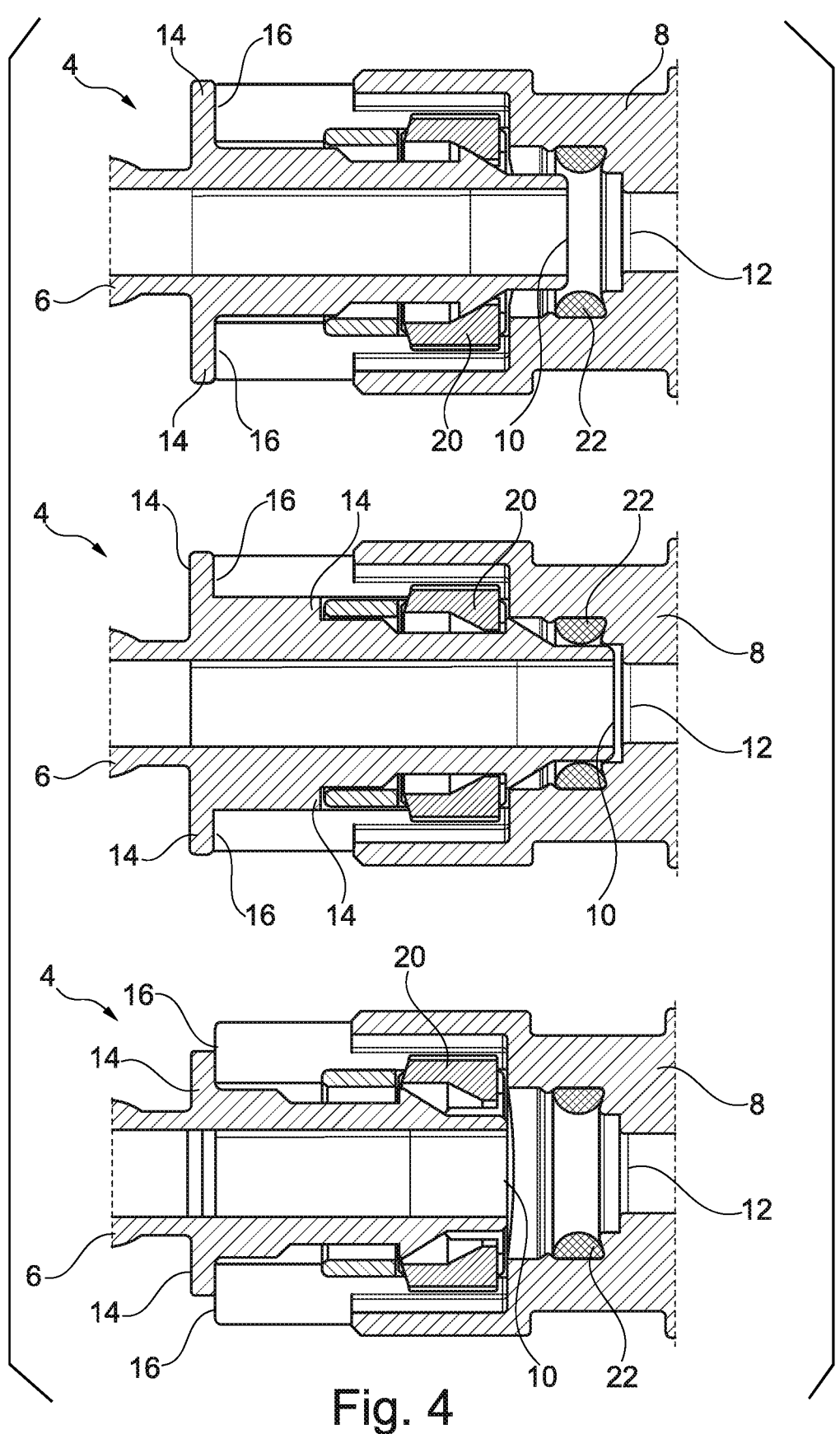
Figure 5:
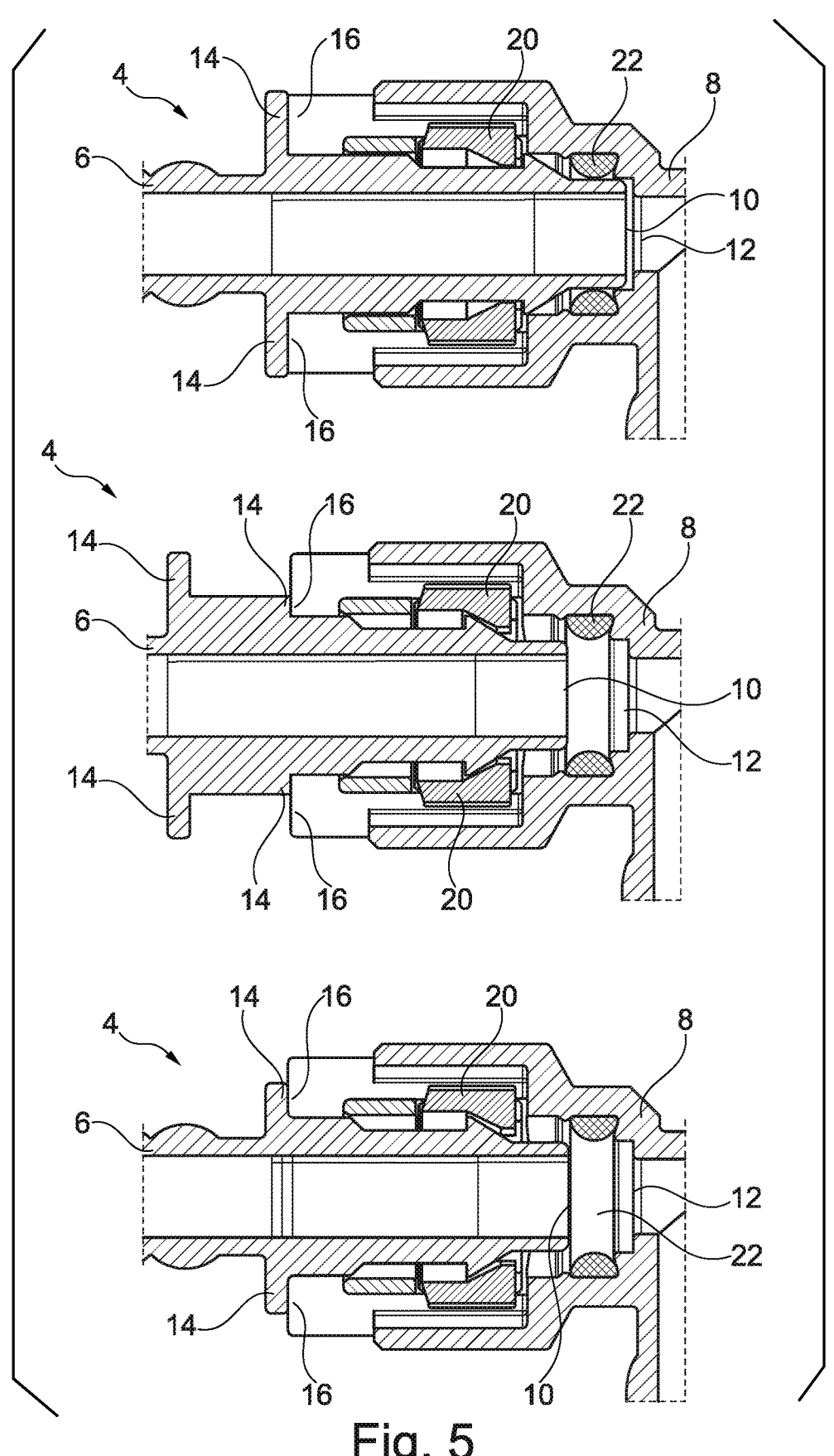
Figures 6, 7, 8, 9, 10, 11, 12, 13, 14:
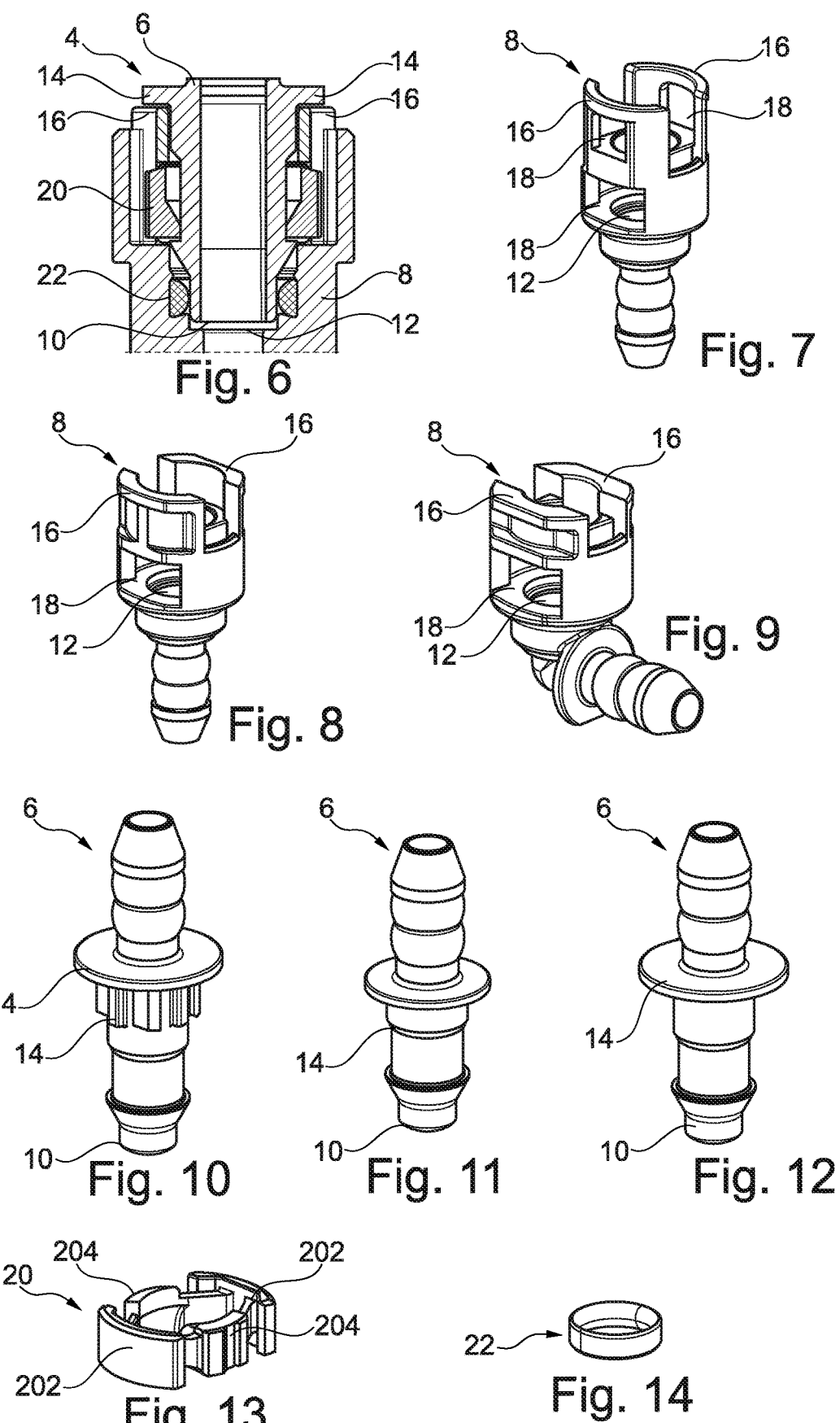
Figure 15:
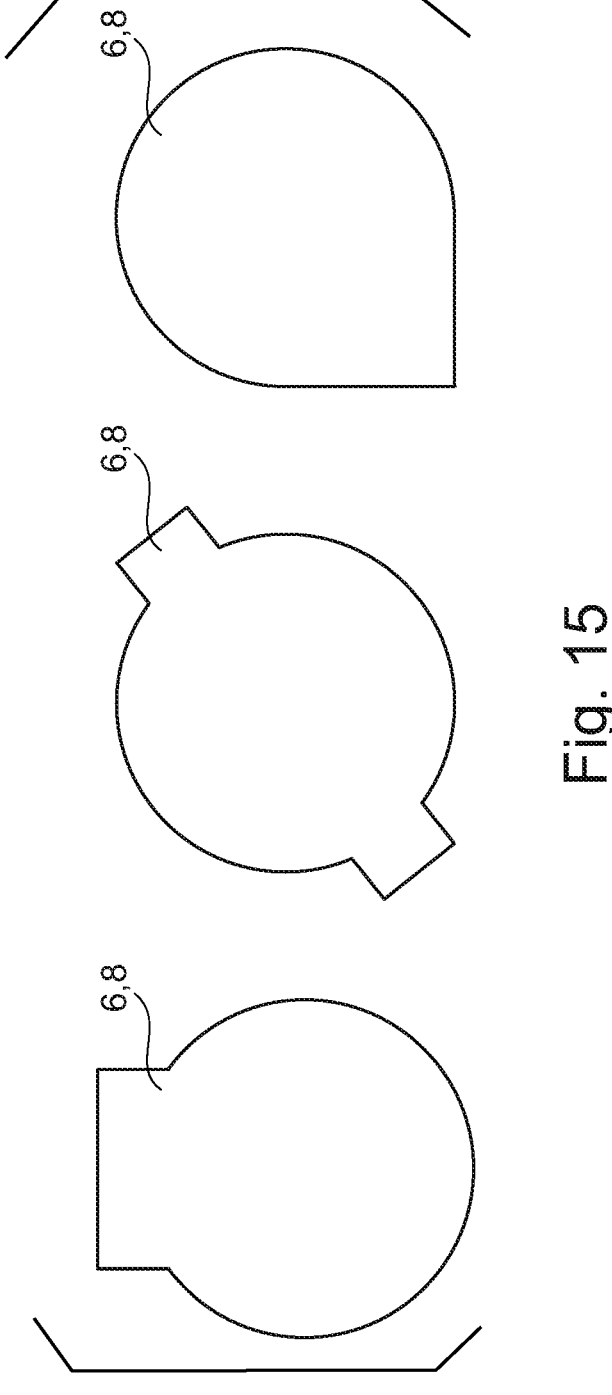

FIG. 1 a schematic view of a fluid connection system;

FIG. 2 a schematic view of a part of the fluid connection system;

FIG. 3 a schematic view of three connections;

FIG. 4 a schematic view of three connections;

FIG. 5 a schematic view of three connections;

FIG. 6 a cross-section of a connection;

FIG. 7 a schematic view of a female connector;

FIG. 8 a schematic view of a female connector;

FIG. 9 a schematic view of a female connector;

FIG. 10 a schematic view of a male connector;

FIG. 11 a schematic view of a male connector;

FIG. 12 a schematic view of a male connector;

FIG. 13 a schematic view of a retaining element;

FIG. 14 a schematic view of a sealing element;

FIG. 15 a schematic cross section of a male connector and a female connector.

DETAILED DESCRIPTION OF THE INVENTION

FIG. 1 shows a schematic view of a fluid connection system 2 for a cleaning system of a car. The fluid connection system 2 comprises three connections 4, wherein each of the three connections 4 comprises a male connector 6 and a female connector 8. The female connectors 8 are not shown. For each of the three connections 4 the male connector 6 comprises an outlet opening 10 and the female connector 8 comprises an inlet opening 12. For each of the three connections 4 the male connector 6 and the female connector 8 are configured to fluidly connect the outlet opening 10 to the inlet opening 12 in an assembled state. For each of the three connections 4 the length of the male connector 6 is adapted to the length of the female connector 8. The length differs for each of the three connections 4.

The fluid connection system comprises a valve 24, wherein the valve 24 is fluidly connected with the three connections 4. The fluid connection system 2 is designed for a fluid pressure from 5 bar, in particular 8 bar, up to 12 bar.

FIG. 2 shows a schematic view of a part of the fluid connection system 2. The fluid connection system 2 comprises three connections 4, wherein each of the three connections 4 comprises a male connector 6 and a female connector 8. For each of the three connections 4 the male connector 6 comprises an outlet opening 10 and the female connector 8 comprises an inlet opening 12. For each of the three connections 4 the male connector 6 and the female connector 8 are configured to fluidly connect the outlet opening 10 to the inlet opening 12 in an assembled state. For each of the three connections 4 the length of the male connector 6 is adapted to the length of the female connector 8. The length differs for each of the three connections 4.

FIG. 3 shows a schematic view of the three connections 4. Here three different male connectors 6 are connected to the same female connector 6. Each male connector 6 comprises an outlet opening 10 and the female connector 8 comprises an inlet opening 12. In FIG. 3 the male connector 6 and the female connector 8 on the left side fit to each other. The male connector 6 and the female connector 8, which fit to each other, are configured to fluidly connect the outlet opening 10 to the inlet opening 12 in an assembled state. Here, the length of the male connector 6 is adapted to the length of the female connector 8 for the male connector 6, which fits to the female connector 8.

As shown in FIG. 3 only the male connector 6 of the left connection 4 of the three connections 4 matches to the female connector 8.

Each male connector 6 comprises limiting elements 14, wherein the limiting elements 14 are spaced apart from the outlet opening 10. The female connector 8 comprises restriction means 16, wherein the restriction means 16 are spaced apart from the inlet opening 12. The length is the distance from the limiting element 14 to the outlet opening 10 and from the restriction mean 16 to the inlet opening 12.

For the left connection 4 the restriction means 16 abut against the limiting elements 14 in the assembled state, and the outlet opening 10 is adjacent to the inlet opening 12 in the assembled state. For the right connection 4 and the connection 4 in the middle the restriction means 16 abut against the limiting elements 14 in the assembled state, but the outlet opening 10 is not adjacent to the inlet opening 12 in the assembled state.

Moreover, each limiting element exhibits an outer diameter OD. The outer diameter OD of each limiting element 14 is different for each male connector of the three connections 4. The female connector 8 comprises an insertion space 17, wherein the insertion space 17 is arranged between the restriction mean 16 and an open end 19 of the female connector 8. The insertion space 17 exhibits an inner diameter ID. The inner diameter ID of the insertion space 17 of the female connector 8 is the same as the outer diameter OD only of the limiting element 14 of the male connector 6 of the same connection of the connections 4. In FIG. 3 the inner diameter ID of the insertion space 17 is only the same as the outer diameter OD of the limiting element 14 for the left connection 4 of the three connections 4.

For all connections 4 the inner diameter of the outlet opening 10 and the inner diameter of the inlet opening 12 are the same.

For the left connection, the male connector 6 is detachably connected with the female connector 8, and the male connector 6 is connected with the female connector 8 in a form-locking and/or force-locking manner. For the other connections the male connector 6 is not connected with the female connector 8 in a form-locking and/or force-locking manner.

As shown in FIG. 3, the female connector 8 comprises an opening 18 at least partially extending from the inlet opening 12 to the at least one restriction mean 16. A retaining element 20 is arranged inside the opening 18, wherein the retaining element 20 fixes in a form-locking and force-locking manner the male connector 6 to the female connector 8 in the assembled state.

The female connector 8 comprises a sealing element 22. The sealing element 22 is a D-ring 22. The sealing element 22 is arranged at the inlet opening 12.

FIG. 4 shows a schematic view of three connections 4. Here three different male connectors 6 are connected to the same female connector 6. Each male connector 6 comprises an outlet opening 10 and the female connector 8 comprises an inlet opening 12. In FIG. 4 the male connector 6 and the female connector 8 in the middle fit to each other. The male connector 6 and the female connector 8, which fit to each other, are configured to fluidly connect the outlet opening 10 to the inlet opening 12 in an assembled state. Here, the length of the male connector 6 is adapted to the length of the female connector 8 for the male connector 6, which fits to the female connector 8.

As shown in FIG. 4 only the male connector 6 of the connection 4 in the middle of the three connections 4 matches to the female connector 8.

FIG. 5 shows a schematic view of three connections 4. Here three different male connectors 6 are connected to the same female connector 6. Each male connector 6 comprises an outlet opening 10 and the female connector 8 comprises an inlet opening 12. In FIG. 5 the male connector 6 and the female connector 8 on the right side fit to each other. The male connector 6 and the female connector 8, which fit to each other, are configured to fluidly connect the outlet opening 10 to the inlet opening 12 in an assembled state. Here, the length of the male connector 6 is adapted to the length of the female connector 8 for the male connector 6, which fits to the female connector 8.

As shown in FIG. 5 only the male connector 6 of the right connection 4 of the three connections 4 matches to the female connector 8.

FIG. 6 shows a cross-section of a connection 4. The male connector 6 comprises an outlet opening 10 and the female connector 8 comprises an inlet opening 12. The male connector 6 and the female connector 8 are configured to fluidly connect the outlet opening 10 to the inlet opening 12 in an assembled state. Here, the length of the male connector 6 is adapted to the length of the female connector 8.

As shown in FIG. 6, the female connector 8 comprises two openings 18 at least partially extending from the inlet opening 12 to the restriction mean 16. A retaining element 20 is arranged inside the two openings 18, wherein the retaining element 20 fixes in a form-locking and force-locking manner the male connector 6 to the female connector 8 in the assembled state.

The retaining element 20 is arranged inside the two openings 18, wherein the two openings 18 are arranged on opposite sides of the female connector 8, wherein the retaining element 20 has to activation planes 202, wherein the activation planes 202 are arranged inside the two openings 18, wherein the retaining element 20 has two arches 204, wherein each arch 204 connects an end of an activation plane 202 to an end of the other activation plane 202, wherein the arches 204 are configured to move to the outside of the female connector 8, when the two activation planes 202 are pressed into the inside of the female connector 8.

The two arches 204 each have a holding mean, wherein the male connector has two receiving means, wherein in the assembled state the holding means interact with the receiving means to fix the male connector 6 inside the female connector 8.

FIG. 7 shows a schematic view of a female connector 8. The female connector 8 comprises an inlet opening 12, two retaining means 16 and three openings 18.

FIG. 8 shows a schematic view of a female connector 8. The female connector 8 comprises an inlet opening 12, two retaining means 16 and two openings 18.

FIG. 9 shows a schematic view of a female connector 8. The female connector 8 comprises an inlet opening 12, two retaining means 16 and two openings 18.

FIG. 10 shows a schematic view of a male connector 6. The male connector comprises an outlet opening 10 and two limiting elements 14. The male connector 6 is monolithic.

FIG. 11 shows a schematic view of a male connector 6. The male connector comprises an outlet opening 10 and two limiting elements 14. The male connector 6 is monolithic.

FIG. 12 shows a schematic view of a male connector 6. The male connector comprises an outlet opening 10 and a limiting element 14. The male connector 6 is monolithic.

FIG. 13 shows a schematic view of a retaining element 20. The retaining element 20 has two activation planes 202. The retaining element 20 has two arches 204, wherein each arch 204 connects an end of an activation plane 202 to an end of the other activation plane 202. The arches 204 are configured to move to the outside of the female connector 8, when the two activation planes 202 are pressed into the inside of the female connector 8.

The two arches 204 each have a holding mean, wherein the male connector has two receiving means, wherein in the assembled state the holding means interact with the receiving means to fix the male connector 6 inside the female connector 8.

FIG. 14 shows a schematic view of a sealing element 22, which is a D-ring 22.

FIG. 15 shows a schematic cross section of a male connector 6 and a female connector 8. The male connector 6 and the female connector 8 have a corresponding rotation symmetry. The rotation symmetry is realized by a rotationally symmetric cross section, wherein the rotationally symmetric cross section is realized by a polygonal cross section. Alternatively, the rotationally symmetric cross section can be realized by a notch.

The invention claimed is:

1. A fluid connection system for a cleaning system of a car,
   wherein the fluid connection system comprises at least two connections,
   wherein each of the at least two connections comprises a male connector having a first length and a female connector having a second length,
   wherein for each of the at least two connections the male connector comprises an outlet opening and the female connector comprises an inlet opening,
   wherein for each of the at least two connections the male connector and the female connector are configured to fluidly connect the outlet opening to the inlet opening in an assembled state,
   wherein for each of the at least two connections the first length of the male connector is adapted to the second length of the female connector,
   wherein
   the first length and the second length differ for each of the at least two connections,
   wherein
   the male connector comprises at least one limiting element,
   wherein the at least one limiting element is spaced apart from the outlet opening,
   wherein the female connector comprises at least one restriction mean,
   wherein the at least one restriction mean is spaced apart from the inlet opening,
   wherein the first length is a distance from the at least one limiting element to the outlet opening and the second length is a distance from the at least one restriction mean to the inlet opening,
   wherein
   the at least one limiting element exhibits an outer diameter,
   wherein the outer diameter of the at least one limiting element is different for each male connector of the at least two connections,
   wherein the female connector of at least one of the at least two connections comprises
   an insertion space, wherein the insertion space is arranged between the at least one restriction mean and
   an open end of the female connector of the at least one of the at least two connections,
   wherein the insertion space exhibits an inner diameter,
   wherein the inner diameter of the insertion space of the female connector of at least one of the at least two connections is the same as the outer diameter only of the at least one limiting element of the male connector of the same connection of the at least two connections.

2. The fluid connection system according to claim 1, wherein
   the male connector of one connection of the at least two connections only matches to the female connector of the same connection of the at least two connections.

3. The fluid connection system according to claim 1, wherein
   the at least one restriction mean abuts against the at least one limiting element in the assembled state, and/or
   wherein the outlet opening is adjacent to the inlet opening in the assembled state.

4. The fluid connection system according to claim 1, wherein
   an inner diameter of the outlet opening and an inner diameter of the inlet opening are the same for all of the at least two connections.

5. The fluid connection system according to claim 1, wherein
   the male connector is detachably connected with the female connector, and/or wherein the male connector is connected with the female connector in a form-locking and/or force-locking manner.

6. The fluid connection system according to claim 1 wherein
   the female connector comprises an opening at least partially extending from the inlet opening to the at least one restriction mean.

7. The fluid connection system according to claim 6, wherein a retaining element is arranged inside the opening.

8. The fluid connection system according to claim 7, wherein the retaining element fixes the male connector to the female connector in the assembled state.

9. The fluid connection system according to claim 7, wherein the retaining element fixes the male connector to the female connector in the assembled state, in a form-locking and/or force-locking manner.

10. The fluid connection system according to claim 1, wherein
    the female connector comprises a sealing element,
    wherein the sealing element is arranged at the inlet opening.

11. The fluid connection system according to claim 10, wherein the sealing element is a D-ring.

12. The fluid connection system according to claim 1, wherein
    the fluid connection system comprises a valve,
    wherein the valve is fluidly connected with the at least two connections.

13. The fluid connection system according to claim 1, wherein
    the fluid connection system is designed for a fluid pressure from 5 bar up to 12 bar.

14. The fluid connection system according to claim 1, wherein the male connector and the female connector of each of the at least two connections have a corresponding rotation symmetry.

15. The fluid connection system according to claim 14, wherein the rotation symmetry is realized by a rotationally symmetric cross section.

16. The fluid connection system according to claim 15, wherein the rotationally symmetric cross section is realized by a notch and/or a polygonal cross section.

17. The fluid connection system according to claim 1, wherein the fluid connection system consists of three connections.

18. A car, comprising a tube, a nozzle and the fluid connection system according to claim 1, wherein the tube, the nozzle and the fluid connection system are fluidly connected.

\* \* \* \* \*